Aug. 17, 1971 E. H. LAND 3,600,172
PROCESS FOR PRODUCING IMAGE PATTERNS IN LAYERS
COMPRISING ELECTROPHOTOLUMINESCENT MATERIALS
Filed Dec. 11, 1968

INVENTOR.
EDWIN H. LAND

BY Brown and Mikulka
and
Alvin Isaacs
ATTORNEYS

United States Patent Office 3,600,172
Patented Aug. 17, 1971

3,600,172
PROCESS FOR PRODUCING IMAGE PATTERNS IN LAYERS COMPRISING ELECTROPHOTOLUMINESCENT MATERIALS
Edwin H. Land, Cambridge, Mass., assignor to Polaroid Corporation, Cambridge, Mass.
Filed Dec. 11, 1968, Ser. No. 783,001
Int. Cl. G03c 1/92; H01j 1/54
U.S. Cl. 96—45.1    15 Claims

ABSTRACT OF THE DISCLOSURE

A process for producing image patterns in layers comprising electrophotoluminescent materials. Essentially the process involves the steps of employing an electroluminescent material to optically excite a layer comprising an electrophotoluminescent material so that the electrophotoluminescent material emits visible light. Thereafter, the excitation is discontinued but the layer comprising the electrophotoluminescent material is maintained under an electrical field and continues to emit visible light. While the layer continues to emit visible light, the subject matter to be reproduced is placed in juxtaposition with the layer for a time sufficient to permit a significant imagewise differential in decay of luminescence so that a positive reproduction of the subject matter is formed in the layer.

BACKGROUND OF INVENTION

Various systems for generating visible light by excitation of a luminescent material or phosphor are known. In general, such systems employ one of three principles: photoluminescence; electroluminescence; or electrophotoluminescence.

Photoluminescence is the name given to the light emitted by phosphors when excited optically, e.g., by ultraviolet light; it involves the transformation into visible wave lengths of invisible light having shorter wave lengths.

On the other hand, electroluminescence and electrophotoluminescence are concerned with the effects of electric fields on the luminescent emission of phosphors. Electroluminescence refers to the light emitted by a suitable phosphor when an electric field is applied to it; whereas electrophotoluminescence pertains to light emission by a phosphor when an electric field is applied during or after excitation by optical means.

Electroluminescent or electrophotoluminescent materials have heretofore been arranged in elements, frequently called panels, which have been employed for various purposes, mainly in specialized forms of lighting. A typical panel includes the phosphor layer, typically a suitable phosphor embedded in a dielectric material, sandwiched between a pair of conducting sheets or electrodes, at least one of which is transparent. They may also include other layers contributing to the stability of the panel.

The copending application of Joel M. Peisach, Ser. No. 783,090 filed Dec. 11, 1968, is directed to the use of electrophotoluminescent panels of the foregoing general description and relates to the use of such panels in novel procedures for obtaining positive or negative visible images of a document or other subject matter.

According to one aspect of the invention disclosed in the aforementioned copending application, positive images may be obtained on an electrophotoluminescent panel by subjecting the panel to excitation by an electric field during or after optical excitation to cause it to glow, removing the source of optical excitation, e.g., an ultraviolet light or lights while maintaining the electric field and thereafter placing a document or other subject matter to be reproduced on the still glowing panel for a given period of time, after which the subject matter is removed from the panel to reveal a positive reproduction thereof.

According to another aspect of the invention of the aforementioned application, negative images may be obtained by first forming a positive image in the aforementioned manner, thereafter turning off the power for a brief period of time and then reapplying the electric field to obtain an image reversal wherein the positive image is converted to a negative image.

In a still further aspect of the invention of the aforementioned application, one or more copies of the aforementioned positive and/or negative images may be obtained by placing a photosensitive element in contact with the glowing imaging panel to expose this element and thereby obtain a latent image of the image on the panel, and thereafter developing the thus exposed element in known manner to form a visible image. The last-named aspect of the present invention is particularly significant in that it provides a document duplication or office copier device which requires no lens or optical system for obtaining one or more copies of the original.

SUMMARY OF THE INVENTION

The present invention is directed to the aforementioned processes and specifically to imaging systems of the foregoing description wherein the source of optical excitation required in conjunction with an applied electric field, to cause the electrophotoluminescent material to glow is included in the panel or cell structure as distinguished from being a separate element, e.g., a UV light source. This may be accomplished by providing an element including an electrophotoluminescent phosphor layer, an electroluminescent phosphor layer, and means for applying an electric field to either or to both. Light emitted by applying an electric field to the electroluminescent phosphor layer provides the required optical excitation for the electrophotoluminescent phosphor layer.

Figure 1:
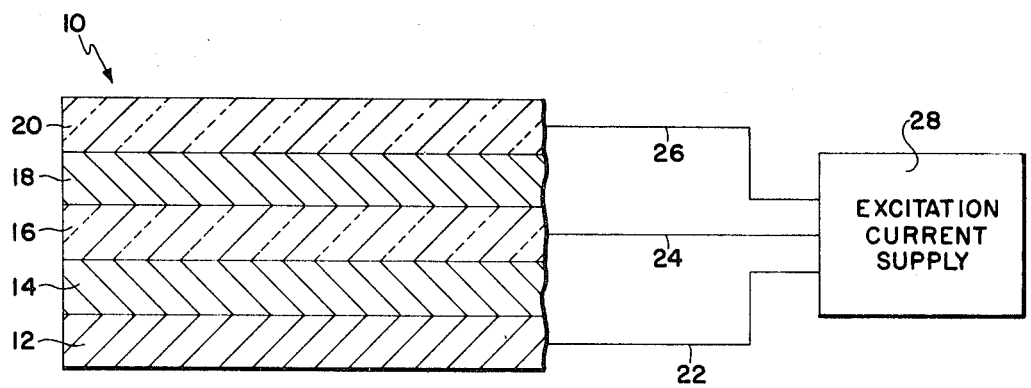
FIG. 1 is a diagrammatic, fragmentary sectional view of the essential elements of one structure for use in the present invention.

As was mentioned previously, the present invention is directed to novel procedures for preparing positive or negative images and, more particularly, to novel processes employing an electrophotoluminescent panel or device to obtain such images.

A primary object of this invention, therefore, is to provide novel processes for obtaining visible images of a document or other subject matter.

Another object is to provide novel processes employing an electrophotoluminescent panel to obtain positive or negative images.

Yet another object is to provide novel processes of the foregoing description wherein no separate source of optical excitation is required.

Still another object is to provide a novel document duplication device requiring no lens or optical system, which device may be employed to obtain, at the discretion or wish of the operator, a positive and/or a negative copy.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings.

As was mentioned previously, the present invention contemplates novel systems employing electrophotoluminescent materials such as those heretofore known in the art to obtain a positive image or reproduction, a negative one, or both.

As used herein and in the appended claims, the term "positive image" is employed in its ordinary photographic usage to define an image in which the highlight (white) areas and the shadow (dark) areas of the image correspond to that of the matter being reproduced; whereas a "negative image" refers to a reversed image in the sense that the highlight and shadow areas of the image are the reverse of those areas of the matter being reproduced.

The aforementioned copending application, Ser. No. 783,090 discloses processes for preparing such images employing the electrophotoluminescent panels such as those heretofore known in the art. A typical such panel includes an electrophotoluminescent material or phosphor in a thin layer sandwiched between a pair of conducting surfaces at least one of which is transparent for viewing. Suitable electrophotoluminescent materials include phosphors of the zinc sulfide or selenide type with a relatively high copper content, e.g., about 0.1% weight of copper as the principal activator. The spectral distribution of the luminescent emission occurs generally in relatively broad bands and, depending on the method of preparation, three different colors are customarily prepared, namely, blue, green and yellow. The blue and green phosphors may be obtained with copper in different proportions as the principal activator. The yellow phosphor may be obtained by using copper and manganese activators. The phosphor in a typical panel is embedded in a dielectric material, e.g., an organic resin or transparent enamel in a thin layer which, as heretofore noted, is sandwiched between two conducting sheets, at least one of which is transparent.

In a typical procedure for preparing the "sandwich" of an electrophotoluminescent cell for use in the aforementioned panel, a transparent conducting film of tin oxide is formed on a sheet of glass to provide a transparent conducting surface. This may be done by spraying hot glass (about 500° C.) with stannic chloride. A suspension of the phosphor in a suitable resin or plastic dielectric medium is then spread on the conducting glass to a thickness of about $100\mu$. A second backing electrode is then applied, e.g., by metallic evaporation or by spraying aluminum.

In order to cause a panel of the foregoing description to glow or emit visible light, an electric field is applied during or after optical excitation to cause the panel to glow. According to one aspect of the invention described and claimed in the aforementioned copending application, positive images may be obtained by first exciting the panel by applying an electric field and exposing the panel to invisible light of shorter wave length than visible light, e.g., UV light, to cause the panel to glow, removing the optical excitation and then placing a document or the like face down on the still glowing panel for a predetermined period of time, e.g., about 30 seconds. Upon removal of the document a positive image is revealed on the panel.

In a second aspect of the invention a negative image is obtained by first forming a positive image on the panel in the aforementioned manner and, thereafter, turning off the power for a short period of time, e.g., about half-second and then re-applying it to provide an image reversal to obtain a reversed or a negative image.

In a third aspect of the invention described in the aforementioned copending application, the imagewise glowing of the panel in either (or both) of the aforementioned aspects is employed to expose one or more photosensitive elements to obtain one or more photographic reproductions of the original subject matter. Thus, for example, a typical photosensitive element having at least one layer of a light-sensitive material may be placed in close optical proximity with the glowing imaging panel for a time sufficient to expose the photosensitive element to obtain a latent or developable image. Upon processing of the thus exposed element in the manner heretofore known in the art a photographic reflection print or transparency may be obtained. An important feature of this last-mentioned embodiment of the invention is that, unlike typical prior photographic systems, no lens or optical system is needed for exposure. Thus, this invention makes it possible to provide an office copier or document duplication system requiring no lens. Moreover, in such a system, one may obtain either a positive or a negative image, or both, at the individual election of the operator, merely by electing to photograph the first-formed positive image, the later-formed negative image, or both.

The present invention is directed to processes of the foregoing description wherein the requisite source of optical excitation is a part of the panel or element structure, thereby obviating the need for an external source of optical excitation, e.g., one or more UV lamps. The present invention may be more readily understood by reference to the accompanying drawing.

As shown in FIG. 1 a device or panel 10 for use in the practice of this invention may comprise a layer of an electroluminescent material or phosphor 14 and a layer of an electrophotoluminescent material or phosphor 18 sandwiched between electrodes or conducting surfaces 12, 16 and 20, as shown. Electrodes 20 and 16 should be transparent and electrode 12 may be opaque or transparent, as desired. Leads 22, 24 and 26, from a suitable excitation current supply 28, are in electrical contact with electrodes 12, 16 and 20, respectively. The particular circuitry for supply 28 will be readily apparent to those skilled in the art and, per se, comprises no part of this invention. It will be appreciated that it includes appropriate means for transmitting power through the leads to apply an electric field to layers 14 and/or 18, as desired.

Layer 18 may comprise any of the known electrophotoluminescent materials in a suitable matrix, e.g., embedded in a dielectric material as heretofore noted. In like manner, layer 14 may comprise any of the heretofore known electroluminescent materials, e.g., of the zinc sulfide or selenide type, which, upon being excited by application of an electric field, will emit light which will provide the requisite optical excitation of the electrophotoluminescent material in layer 18, e.g., light of shorter wave length than visible light. The light emitted by electroluminescent material may include visible or "non-exciting" light as well, the only prerequisite being that the light emitted must include the portion of the spectrum required for optical excitation of the electrophotoluminescent material, e.g., UV light. The electroluminescent material may also be embedded in a sutiable dielectric material. Layers 14 and 18 may be applied in the manner heretofore described and may, for example, be on the order of about $100\mu$ thick.

Figure 2:
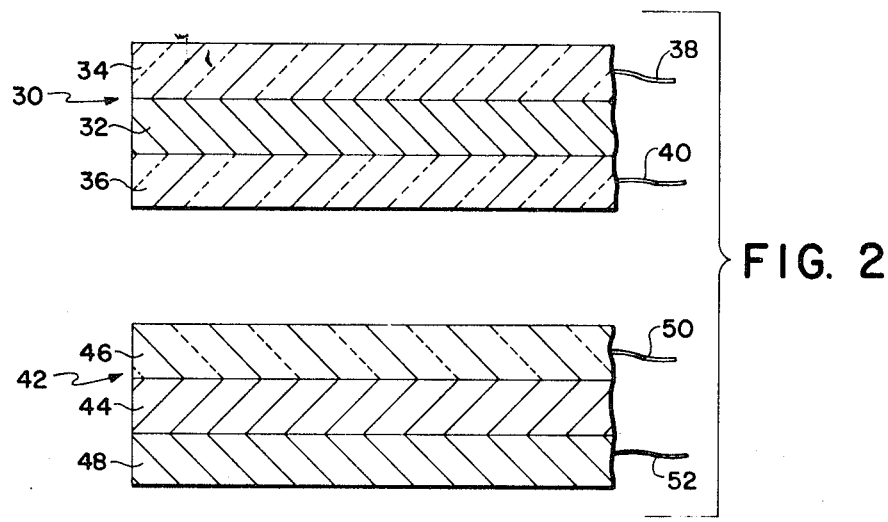
FIG. 2 is a similar view of another structure which may be employed in the practice of this invention.

FIG. 2 shows another type of structure contemplated for use in the present invention, the essential difference being that each luminescent material or phosphor layer has its own pair of electrodes rather than sharing one common electrode as in the structure shown in FIG. 1. As shown in FIG. 2, a first cell 30 is provided comprising a layer of an electrophotoluminescent material 32 sandwiched between a pair of transparent electrodes 34 and 36 having leads 38 and 40, respectively, extending to a suitable excitation current supply (not shown). A second cell 42 is provided comprising an electroluminescent phosphor layer 44 sandwiched between transparent electrode 46 and another electrode 48, which may be opaque. Leads 50 and 52, from a suitable excitation current supply (not shown), are in electrical contact with electrodes 46 and 48, respectively.

Cell 42 is positioned in the device with respect to cell 30 so that light emitted from layer 44 may provide the requisite optical excitation for layer 32. The respective cells are preferably contained in the same element, e.g., encased around the periphery in superposition to provide a unitary element. In so doing, it will be appreciated that electrodes 46 and 36 should be in spaced relationship so as not to be in electrical contact with one another. A preferred procedure would be to provide a layer of transparent insulating material, e.g., glass, plastic, or the like, between electrodes 46 and 36.

Cells 30 and 42 may share a common power supply, or separate power supplies may be provided. In fact, an element including the two cells of FIG. 2 may be advantageously employed in a structure wherein each cell has its own power supply in systems wherein it is desired that each cell function under different electric fields, e.g., under different applied voltage and/or frequency, or in instances where it may be desired to apply a D.C. field to one and an A.C. field to the other.

Structures such as are shown in the drawing may be readily employed in the aforementioned processes to obtain positive and/or negative images. Thus, for example, and with reference to the structure shown in FIG. 1, the power source is turned on to apply an electric field to both phosphor layers concurrently, e.g., current is caused to flow from the power source through both leads 22 and 26. The applied electric field first causes the electroluminescent phosphor layer 14 to glow and the light emitted by this layer in turn provides the optical excitation necessary to cause electrophotoluminescent phosphor layer 18 to emit visible light. The applied electric field is thereafter removed from phosphor layer 14, for example, by turning off the power supply through lead 22, thereby quenching layer 14. It will be appreciated that the electric field is maintained through electrodes 16 and 20 so that phosphor layer 18 still continues to glow.

A positive image may then be obtained in the manner described in the aforementioned copending application by placing a document or the like to be reproduced face down on the glowing panel, i.e., on electrode 20, for the requisite period of time, say, for example, about 30 seconds. Upon removal of the document, a positive image is revealed through electrode 20. In like manner, a negative image may thereafter be obtained by briefly removing the electric field from the glowing imaging phosphor layer 18, e.g., for about a half-second, and then re-applying it to obtain image reversal. Finally, it will be appreciated that the glowing panel containing the positive or negative image produced in accordance with this invention may be employed to expose one or more photosensitive elements placed successively in close optical proximity with the glowing imaging panel to obtain one or more photographic reproductions of the original subject matter.

In a typical procedure of this nature for forming black-and-white images, the photosensitive element comprises a suitable support bearing a light-sensitive silver halide emulsion. Upon development of the thus exposed element, exposed areas of the emulsion are reduced to image silver to provide a negative or reversed image. This negative may then be used in known manner to obtain positive prints. A preferred system employs what is known as silver diffusion transfer to obtain a positive silver image in a single step. In a typical procedure of this type, the exposed element containing the developable image is developed by applying an aqueous alkaline composition including a silver halide solvent and a silver halide developing agent in a substantially uniform layer between the thus exposed light-sensitive emulsion layer and a superposed silver-receptive stratum. In exposed areas of the emulsion, the silver halide is reduced to silver while at substantially the same time an imagewise distribution of a soluble silver complex is formed in terms of unexposed areas of the emulsion. This imagewise distribution is transferred, at least in part, by imbibition, to the silver-receptive stratum where it is reduced to image silver to impart thereto a positive silver transfer image. Silver transfer processes of this nature are described, for example, in U.S. Pat. No. 2,543,181 issued to Edwin H. Land, and many other patents.

It is contemplated that color images may be obtained in the foregonig manner, and these images may be monochromatic or multicolor. One particularly useful system for preparing color images is that described and claimed in U.S. Pat. No. 2,983,606, issued to Howard R. Rogers.

It will be appreciated that the foregoing systems for obtaining photographic images from the glowing panel are illustrative only and the present invention is adaptable to any of the prior photographic systems of this nature.

From the foregoing description it will be seen that the present invention provides novel systems utilizing electrophotoluminescent materials in processes within the scope of those described and claimed in copending application Ser. No. 783,090 to obtain positive and/or negative images of a document or the like to be copied. The panel or element containing the glowing imaging phosphor layer may be used as such, e.g., for display purposes and then erased by decay or quenching of the phosphor or, in lieu thereof, this image may then be employed to photoexpose one or more photosensitive elements successively to provide, by known photographic procedures, one or more permanent photographs of the original which photographs may be positives or negatives according to the desires of the practitioner. The present invention therefore further contemplates providing a document duplicating device requiring no lens or optical system to obtain satisfactory copies.

A typical document duplicating device for use in accordance with this invention need, for example, only comprise a light-tight housing, an imaging panel such as shown in the illustrative drawing and described above, and means for containing a source of film within the housing for obtaining a photographic image of a glowing panel. The device would further include means for applying an electric field to the panel as heretofore described to cause the electrophotoluminescent layer to glow, means for placing a document or other subject matter to be reproduced on the glowing panel, means for removing the document, means for advancing the photosensitive film into optical proximity with the panel, a developing station, exit stations for the document and the photographic reproduction, and transport means for conveying the two from the various stations. It will be appreciated that the device should further contain appropriate switches for controlling the source of current to the panel. Other more sophisticated refinements will be readily apparent.

Since certain changes may be made in the above product and processes without departing from the scope of the invention herein involved, it is intended that all matter contained in the above description or shown in the accompanying drawings shall be interpreted as illustrative and not in a limiting sense.

What is claimed is:
1. A process for forming images which comprises the steps of:
(a) applying an electric field to an electroluminescent material to cause said material to emit light,
(b) optically exciting a layer comprising an electrophotoluminescent material with light emitted from the material of step (a) while an electrical field is applied to said layer to thereby cause said electrophotoluminescent material to emit visible light,
(c) eliminating said optical excitation while maintaining the application of said electric field to said layer to thereby cause said electrophotoluminescent material to continue to emit visible light and, (d) placing the subject matter to be reproduced in juxtaposition with said layer for a period of time sufficient to permit a significant imagewise differential in decay of luminescence of said electrophotoluminescent material to form a positive reproduction of said subject matter in said layer.

2. A process as defined in claim 1 including the step of removing said subject matter from said layer.

3. A process as defined in claim 2 including the steps of placing a photosensitive element in juxtaposition with said positive image for a time sufficient selectively to expose said photosensitive element to the imagewise emission of visible light from said material in said layer to form a developable image; and thereafter developing said exposed element to provide a photographic reproduction of said subject matter.

4. A process as defined in claim 3 wherein said photosensitive element includes a light-sensitive silver halide emulsion and said image is in silver.

5. A process as defined in claim 3 wherein said photographic image is a positive silver transfer image.

6. A process as defined in claim 2 further including the step of removing said electrical field for a short time after formation of said positive reproduction and then reapplying it to obtain an image reversal whereby said positive image is converted into a negative image.

7. A process as defined in claim 6 including the steps of placing a photosensitive element in juxtaposition with said negative image for a time sufficient selectively to expose said photosensitive element to the imagewise emission of visible light from said material in said layer to form a developable image; and thereafter developing said exposed element to provide a photographic reproduction of said subject matter.

8. A process as defined in claim 7 wherein said photosensitive element includes a light-sensitive silver halide emulsion and said image is in silver.

9. A process as defined in claim 7 wherein said photographic image is a positive silver transfer image.

10. A process for forming images comprising the steps of applying an electric field to a layer of an electroluminescent material to cause it to emit light; applying an electric field to a layer of an electrophotoluminescent material and optically exciting said electrophotoluminescent material with light emitted by said electroluminescent material, whereby to cause said electrophotoluminescent material to emit visible light; removing the electric field from said electroluminescent material whereby to quench the emission of light by said material while maintaining the electric field applied to said electrophotoluminescent material, whereby said electrophotoluminescent material continues to emit visible light; and placing the subject matter to be reproduced in juxtaposition with said layer of material for a predetermined period of time sufficient to permit a significant imagewise differential in decay of luminescence of said electrophotoluminescent material to form in said layer of electrophotoluminescent material a positive reproduction of said subject matter.

11. A process as defined in claim 10 including the steps of placing a photosensitive element in juxtaposition with said positive image for a time sufficient selectively to expose said photosensitive element to the imagewise emission of visible light from said material in said layer to form a developable image; and thereafter developing said exposed element to provide a photographic reproduction of said subject matter.

12. A process as defined in claim 10 further including the step of removing said electrical field for a short time after formation of said positive reproduction and then reapplying it to obtain an image reversal whereby said positive image is converted into a negative image.

13. A process as defined in claim 12 including the steps of placing a photosensitive element in juxtaposition with said negative image for a time sufficient selectively to expose said photosensitive element to the imagewise emission of visible light from said material in said layer to form a developable image; and thereafter developing said exposed element to provide a photographic reproduction of said subject matter.

14. A document copying process comprising the steps of:

(a) providing a cell comprising a layer of an electrophotoluminescent material within a light tight enclosure, (b) providing a layer of a luminescent material which can optically excite said electrophotoluminescent material within said light tight enclosure, (c) applying an electrical field to said layers to thereby cause said luminescent material to optically excite said electrophotoluminescent material and emit visible light, (d) eliminating said optical excitation but maintaining said electrical field to thereby cause the layer comprising the electrophotoluminescent material to continue to emit visible light, (e) placing a document to be copied in juxtaposition with said layer comprising said electrophotoluminescent material to form a positive reproduction in said layer, (f) removing the document and placing a photosensitive element comprising a layer of a light-sensitive material in juxtaposition with said layer comprising said positive reproduction to form a developable image pattern in said layer of light sensitive material, (g) advancing said element to a developing station within said enclosure where said element is developed to provide a visible photographic image of said document and (h) removing said developed element from said enclosure.

15. A process as defined in claim 14 wherein said light-sensitive material is a silver halide emulsion and said photographic image is a positive silver transfer image.

References Cited

UNITED STATES PATENTS

| | | | |
|---|---|---|---|
| 2,933,602 | 4/1960 | Gillson | 250—71 |
| 2,957,940 | 10/1960 | Cusano | 313—108X |
| 3,125,681 | 3/1964 | Johnson | 313—108X |
| 3,215,847 | 11/1965 | Ranby et al. | 250—217 |
| 3,238,859 | 3/1966 | Manchly | 96—45.1X |
| 3,497,750 | 2/1970 | Knochel et al. | 313—108 |

WILLIAM D. MARTIN, Primary Examiner

E. J. CABIC, Assistant Examiner

U.S. Cl. X.R.

96—82; 250—71R; 313—108A; 355—11, 78